Jan. 10, 1967 W. L. RENDESSY 3,297,340
TRAILER HITCH
Filed June 24, 1965
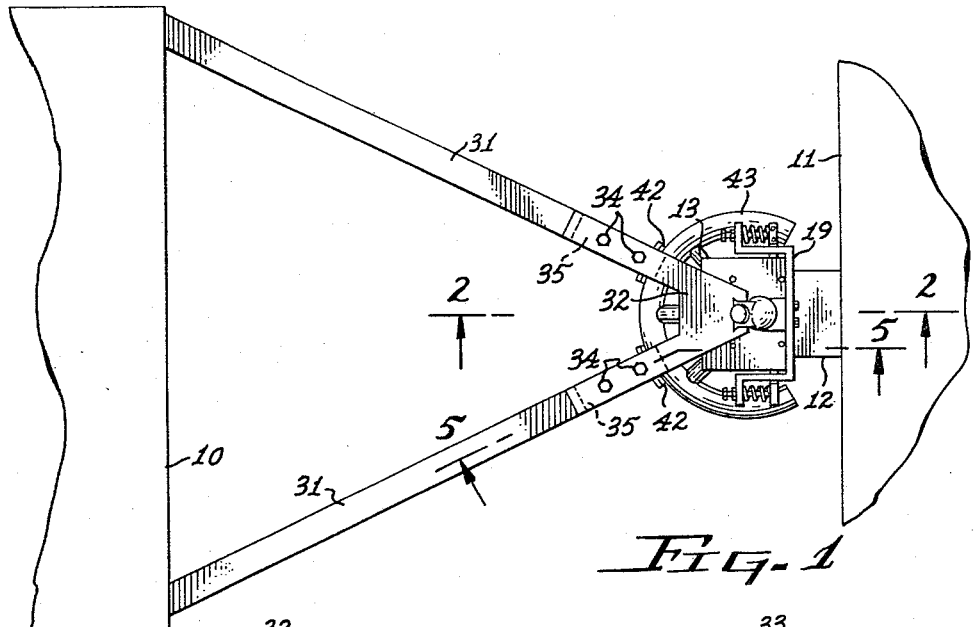
Fig-1
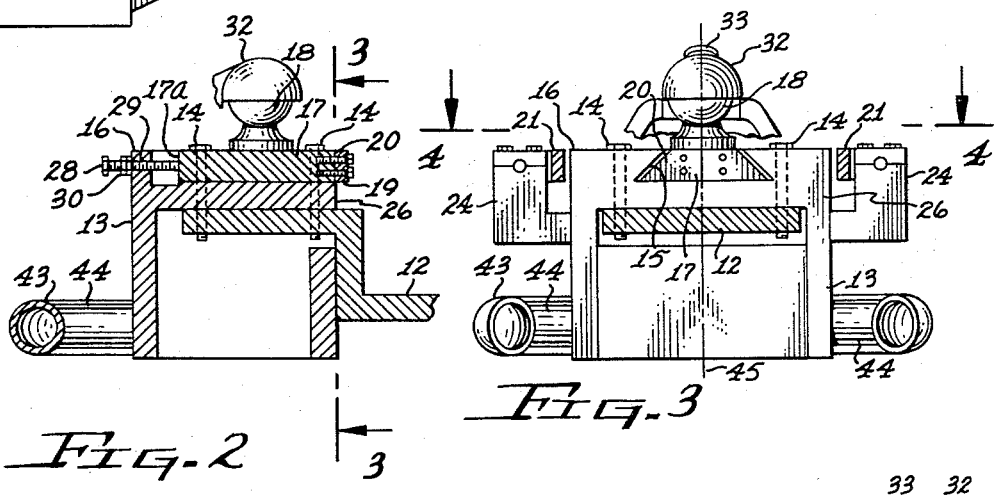
Fig-2
Fig-3
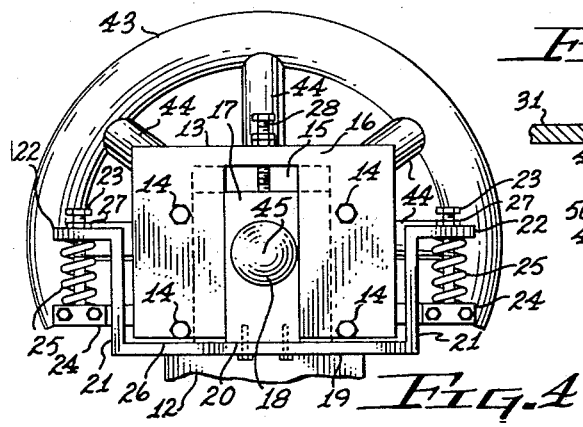
Fig-5
Fig-4
INVENTOR.
WILLIAM L. RENDESSY
BY
Willard S. Groen
ATTORNEY United States Patent Office 3,297,340
Patented Jan. 10, 1967

3,297,340
TRAILER HITCH
William L. Rendessy, Phoenix, Ariz., assignor of fifteen percent to Phoenix Electronics Components, Inc., Phoenix, Ariz., a corporation of Arizona
Filed June 24, 1965, Ser. No. 466,763
5 Claims. (Cl. 280—432)

This invention pertains to trailer hitches and more particularly to a jackknife free trailer hitch structure.

One of the objects of this invention is to provide a trailer hitch which prevents sway and jackknifing during the operation of the towing vehicle under adverse conditions.

Another object of this invention is to provide a trailer hitch apparatus which automatically increases the frictional restraint of the pivotal connection when braking to a stop and when going down hills.

It is a further object of this invention to provide a trailer hitch which operates with uniform frictional restraint for any relative angular position of the pivoting members of the trailer and towing vehicle.

Still another object is to provide a trailer hitch which is quiet and efficient in operation yet is simple and sturdy for prolonged use under adverse conditions.

Further features and advantages of this invention will appear from a detailed description of the drawings in which:

FIG. 1 is a plan view of a trailer hitch incorporating the features of this invention.

FIG. 2 is an enlarged sectional view on the line 2—2 of FIG. 1.

FIG. 3 is a sectional view on the line 3—3 of FIG. 2.

FIG. 4 is a sectional view on the line 4—4 of FIG. 2.

FIG. 5 is an enlarged fragmentary sectional view on the line 5—5 of FIG. 1.

As an example of one embodiment of this invention there is shown a trailer hitch for interconnecting a trailer frame 10 with a towing vehicle frame 11 comprising a bracket 12 rigidly fixed to the frame 11 of the towing vehicle to which is rigidly fixed the carriage 13 by suitable bolts 14. A dovetail slot 15 extending front and rear of the towing vehicle is formed in the top surface 16 of the carriage 13 which is arranged to receive the mating dovetail slide 17 in the top of which is mounted the usual trailer hitch pivot ball 18. A strap piece 19 is fixed to the forward end 20 of the dovetail slide 17 and has rearwardly extending arms 21 terminating at their rear ends in bent-over portions 22 through which pass adjusting bolts 23 with lock nuts 27 having their inner ends secured to anchor blocks 24 suitably secured to the carriage 13. Compression springs 25 are located between the bent-over ends 22 and the anchor blocks 24 so as to normally yieldingly urge the dovetail slide 17 rearwardly, engagement of the strap piece 19 with the forward end 26 of the carriage 13 limiting said rearward travel of the slide 17 when limit control screws 28 are fully retracted. The limit control screws 28 are threadedly mounted at 29 on the caarriage 13 having suitable lock nuts 30 engage the abutment surface 17a on the rear end of the dovetail slide 17 so as to stop the slide 17 in any desired position relative to the carriage 13 independent of the strap piece 19 so as to position the hitch ball 18 relative to the carriage 13 during severe braking and downhill operation.

Fixed to the trailer frame 10 are a pair of angularly disposed draw bars or arms 31 converging forwardly and rigidly connected by screws 34 to a common trailer ball receptacle member 32 which pivotally receives in demountable fashion the trailer ball 18 by means of the usual latch mechanism 33. A braking or pivotal restraining unit 35 is mounted on each of the arms 31, each comprising a square tubular guide tube 36 rigidly fixed to the arm 31 by suitable bolts 37. Within the bore of the tube 36 is the brake shoe plunger 38 limited in sliding movement in the tube by the limit bolt 39 fixed to the plunger 38 and extending through the elongated slot 40 formed in the guide tube 36. A brake shoe plate 41 is fixed to the outer end of the plunger 38 and has a brake shoe 42 of suitable material mounted on a suitable vertically disposed dovetail 42a thereon which contacts a braking ring 43 rigidly mounted on suitable mounting supports 44 fixed to the carriage 13, the segmentally shaped braking ring 43 being substantially coaxial with the axis 45 of the trailer hitch pivot ball 18. Behind the brake shoe plunger 38 is a compression spring 46 which is backed up by the compression collar 47 carried on the end of the adjusting screw 48 threadedly mounted at 49 and locked in adjusted positions therein by the lock nut 50 so as to regulate the relative pressure of the brake shoe 42 against the periphery of the braking ring 43 so as to restrain free pivotal movement of the trailer hitch arms 31 about the pivot axis 45 of the trailer hitch ball 18. In certain instances it may be desirable to make the guide tubes relatively adjustable on the arms 31 for initial positioning of the tubes 36 and the brake shoes 42 to the braking ring 43 by providing suitable clearance holes 51 for the bolts 37.

In operation: When the trailer is in normal forward motion the brake shoe 42 will be engaged with the periphery of the braking ring 43 causing a frictional restraint or drag against the free pivotal movement about the trailer ball axis 45. When the brakes are applied on the towing vehicle causing the trailer to push forward causing the trailer ball on the slide 17 to move relatively forwardly on the carriage 13 which will automatically cause the brake shoe 42 to move more tightly against the braking ring 43 causing a positive braking lock to prevent the trailer from jackknifing and swinging about the pivot axis 45. Thus, during normal driving the spring 46 applies a limited moderate slipping frictional drag against the periphery of the braking ring 43 but when stopping the brake shoe applies additional positive braking force against the braking ring to arrest all such pivotal movement about the axis 45.

While the apparatus herein disclosed and described constitutes a preferred form of the invention, it is also to be understood that the apparatus is capable of mechanical alteration without departing from the spirit of the invention and that such mechanical arrangement and commercial adaptation as fall within the scope of the appendent claims are intended to be included herein.

Having thus fully set forth and described this invention what is claimed and desired to be obtained by United States Letters Patent is:

1. A trailer hitch for pivotally interconnecting the trailer with the towing vehicle comprising in combination:
    (A) a trailer frame,
    (B) a towing vehicle frame,
    (C) a carriage fixed on said towing vehicle frame,
    (D) a slide mounted for limited forward and rearward movement on said carriage,
    (E) a trailer hitch pivot ball fixed on said slide,
    (F) a trailer ball receptacle fixed to said trailer frame,
    (G) a braking ring fixed to said carriage,
    (H) a brake shoe movably mounted on said trailer frame for movement relative to said braking ring,
    (I) and means on said trailer frame to yieldingly urge said brake shoe toward said braking ring.

2. A trailer hitch for pivotally interconnecting the trailer with the towing vehicle comprising in combination:
    (A) a trailer frame, (B) a towing vehicle frame,
(C) a carriage fixed on said towing vehicle frame,
(D) a slide mounted for limited forward and rearward movement on said carriage,
(E) a trailer hitch pivot ball fixed on said slide,
(F) a trailer ball receptacle fixed to said trailer frame,
(G) a braking ring fixed to said carriage,
(H) a brake shoe movably mounted on said trailer frame for movement relative to said braking ring,
(I) means on said trailer frame to yieldingly urge said brake shoe toward said braking ring,
(J) and means for yieldingly urging said slide rearwardly relative to said carriage.

3. A trailer hitch interconnecting a towing vehicle and a trailer comprising in combination:
(A) a trailer hitch pivot ball mounted for limited forward and rearward movement on the towing vehicle,
(B) means on said towing vehicle to yieldingly urge said trailer hitch pivot ball rearward,
(C) a braking ring fixed on said towing vehicle,
(D) a brake shoe movably mounted on said trailer arranged to engage said braking ring,
(E) and means on said trailer to yieldingly urge said brake shoe into engagement with said braking ring.

4. A trailer hitch interconnecting a towing vehicle and a trailer comprising in combination:
(A) a trailer hitch pivot ball mounted for limited forward and rearward movement on the towing vehicle,
(B) means on said towing vehicle to yieldingly urge said trailer hitch pivot ball rearward,
(C) a braking ring having a peripheral annular braking surface fixed on said towing vehicle,
(D) a plurality of angularly disposed brake shoes each mounted on said trailer and arranged to engage the braking surface of said braking ring at circumferentially spaced positions on said braking ring,
(E) and means on said trailer to yieldingly urge said brake shoe into engagement with said braking ring.

5. A trailer hitch interconnecting a towing vehicle and a trailer comprising in combination:
(A) a trailer hitch pivot ball mounted for limited forward and rearward movement on the towing vehicle,
(B) means on said towing vehicle to yieldingly urge said trailer hitch pivot ball rearward,
(C) a braking ring mounted on said vehicle having a peripheral annular braking surface having an axis substantially coinciding with the axis of pivoting of said trailer hitch pivot ball when in its rearward position.

References Cited by the Examiner

UNITED STATES PATENTS

| | | | |
|---|---|---|---|
| 2,499,013 | 2/1950 | Wood | 280—432 |
| 2,564,592 | 8/1951 | Bishop | 280—432 |
| 2,692,145 | 10/1954 | Hammond et al. | 280—432 |
| 2,822,188 | 2/1958 | Begin | 280—432 |

FOREIGN PATENTS 901,988  12/1953  Germany.

BENJAMIN HERSH, *Primary Examiner.*

C. C. PARSONS, *Assistant Examiner.*